Sept. 6, 1955
H. Q. NORTH
2,717,341
ASYMMETRICALLY CONDUCTIVE DEVICE
Filed Oct. 11, 1949
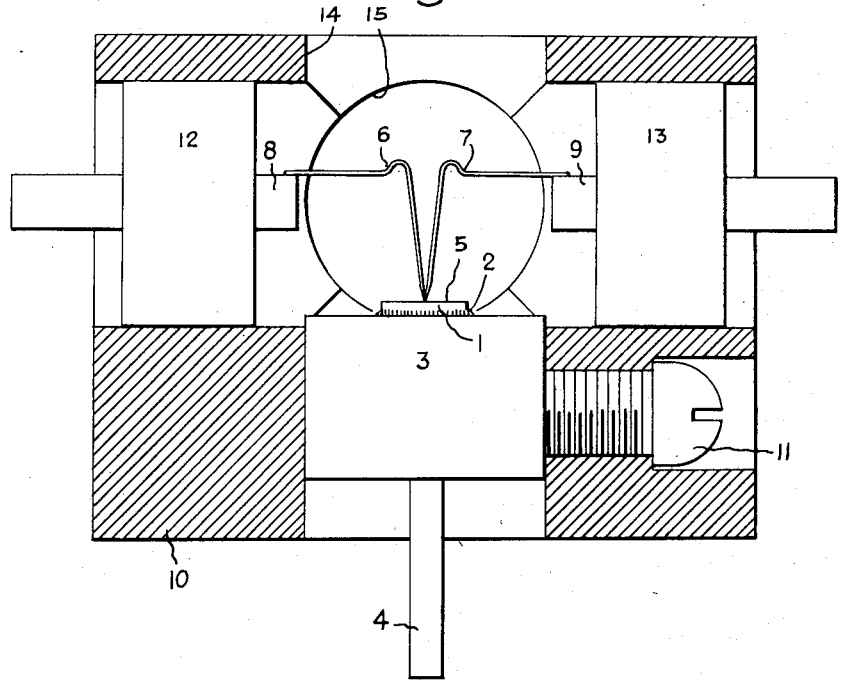
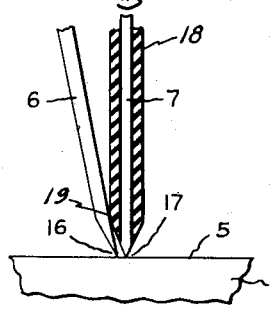
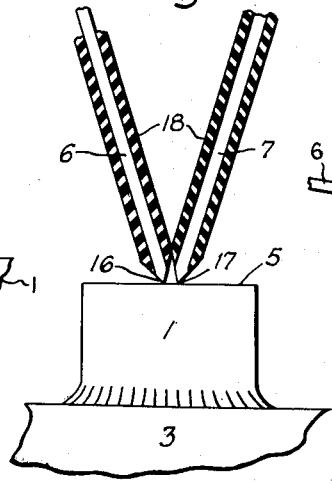
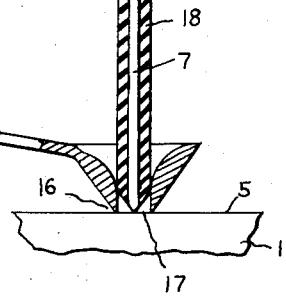
Inventor:
Harper Q. North,
by Paul A. Frank
His Attorney.

United States Patent Office 2,717,341
Patented Sept. 6, 1955

2,717,341

ASYMMETRICALLY CONDUCTIVE DEVICE

Harper Q. North, Los Angeles, Calif., assignor to General Electric Company, a corporation of New York Application October 11, 1949, Serial No. 120,766

3 Claims. (Cl. 317—235)

This invention relates to asymmetrically conductive devices employing the rectifying action between a point contact and a semi-conductor wherein this action is controlled or modified by an additional contact of small area. Certain of these devices have become known as transistors.

An object of the invention is to provide an improved construction for amplifying devices wherein the flow of current between a semi-conductor member and a member in contact therewith is controlled by the potential of a second auxiliary contact or exciter electrode.

Rectifiers of the contact type employing a semi-conductor consist of a slab of a semi-conductor material, such as germanium or silicon, having distinct surface portions in contact with conductors, one of which, hereinafter termed the collector electrode, makes a small area contact such as substantially punctiform contact. The other or return conductor is in contact over a relatively large area, the rectifying action of the device taking place between the two conductors.

The rectifying action of such a slab of semi-conductor material can be controlled by means of an auxiliary conductor, hereinafter termed the exciter electrode, which makes a small area contact such as substantially point or line contact with that face of the slab with which the collector electrode is associated and spaced a small distance, of the order of five-thousandths of an inch, from the small area of contact of the collector electrode. If a variable voltage is applied between the exciter electrode and the return conductor, a variable current can be caused to flow in a circuit including the collector electrode and can be made to develop a voltage and current of similar waveform to that applied to the exciter electrode but of greater value, i. e., an amplifying effect can be obtained. Difficulty, however, is experienced in obtaining the small and critical spacing between the exciter and collector electrodes and in maintaining stable operation of such a device.

It is therefore an object of my invention to provide an improved asymmetrically conductive device structure wherein the adjustment of the small and critical spacing between the exciter and collector electrodes may be quickly and easily obtained.

According to the present invention the exciter and collector electrodes are disposed in contact with a face of the semi-conductor material and maintained in relatively spaced positions by a coating of insulating material of suitable thickness on one of the electrodes.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 shows, partially in section, an asymmetrically conductive device in accordance with the invention; Fig. 2 is a detailed view, enlarged and partly in section, of the electrode structure at the points of contact of the electrodes with the semi-conductor element, Fig. 3 is a view corresponding to Fig. 2 of a second embodiment of the invention, and Fig. 4 is a corresponding view illustrating a further embodiment of the invention.

Referring more specifically to Fig. 1 of the drawing, a device according to the invention may comprise a slab 1 of a semi-conductor material such as germanium. Slab 1 is soldered at the base at 2 with a pure tin solder to a supporting button 3 which is preferably of a good conductor material such as silver. Affixed to the bottom of supporting button 3 is a conductive lead 4 for external electrical connection to the transistor.

Slab 1 has an upper face 5 and exciter and collector electrodes are provided in the form of pointed or sharpened wires 6 and 7 engaged to this face of the slab. These electrodes may preferably be of Phosphor bronze and are spot welded to electrically conductive supporting members 8 and 9 which may be of nickel.

The entire device is housed within a cartridge 10 which may be of a suitable material such as brass. Button 3 is firmly positioned within an opening in cartridge 10 by means of a set screw 11, and members 8 and 9 are also appropriately positioned in the cartridge by means of non-conductive beads 12 and 13 which are press-fitted into appropriate openings in the cartridge. Beads 12 and 13 may be of a superpolyamide material such as nylon.

Openings at 14 and 15 may be provided in cartridge 10 to facilitate adjustment of the electrodes 6 and 7, and when such adjustment has been accomplished, these openings may be closed by suitable covers, not shown. The interior of the cartridge may be filled through these openings with an insulating wax to maintain the electrodes in the adjusted positions.

Fig. 2 is a detailed view, partially in section, of a portion of the device of this invention showing a small portion of the semi-conductor slab 1 and the ends of the electrodes 6 and 7 in contact with the upper surface 5 of the semi-conductor material at points 16 and 17. Electrode 7 is coated with an insulating material 18 such as an insulating lacquer or glass or other preferably hardenable liquid insulating material. This material has been removed at the electrode point 17 in order that the electrode may make a conductive point contact with the upper surface 5 of the semi-conductor material. The insulating material may be removed from this portion of the electrode by mechanical means at the time that the electrode is sharpened to form point 16, or it may be removed by the use of a suitable solvent. Only enough of the insulating material 18 is removed to expose point 17 adequately. The insulating material therefore remains at substantially its undisturbed thickness at point 19 directly between the electrodes 6 and 7. To obtain the proper spacing between electrode points 16 and 17 on the surface 5 of semi-conductor slab 1, electrodes 6 and 7 are adjusted to touch one another in the contiguous manner shown in the Fig. 2, and they are then properly spaced at their points of contact 16 and 17 by reason of the predetermined thickness of the insulation material 18 at point 19.

It will be seen from the above that, in the structure of this invention, one of the most difficult problems in transistor construction and adjustment, that of adjusting the electrodes into very closely spaced relationship without actually causing a short circuit between them has been solved in a simple and economical manner. It will be understood, of course, that the two electrodes 6 and 7 and the insulation 18 might be manufactured together and sharpened together in a pre-adjusted spaced relationship. The two independently downwardly extending points 16 and 17 might then be freed of insulating material 18 by means of a suitable solvent.

It will be obvious that, according to this invention, either the exciter electrode, or the collector electrode, or both, may be coated with an insulating material in order to obtain the proper electrode spacing by use of the proper insulation thickness or combination of thicknesses. The embodiment in which both electrodes are coated with an insulating material is illustrated in Fig. 4 of the drawing. If the points 16 and 17 of the electrodes 6 and 7 are sharpened off-center, that is so that the respective point does not fall on the axis of the respective electrode wire as shown for point 16 on electrode 6 in Fig. 2, the spacing of the electrode points 16 and 17 may be easily given a fine adjustment by rotating the electrode with the off-center point while continuously maintaining the spacing between the bodies of the electrodes, by means of the insulation as described above. It will also be obvious that adjustment is possible by changing the angle between the electrodes 6 and 7.

Fig. 3 is a detailed view, corresponding to Fig. 2, of a second embodiment of this invention involving a contact structure in which electrode 6 employs a tip at 16 which surrounds electrode 6 and preferably is of a funnel shape, the electrode tip 17 of electrode 7 making contact at the center of the funnel, and the funnel-shaped electrode itself making a circular sharpened edge contact with the upper surface 5 of semi-conductor material 1. The electrodes are again insulated and spaced from one another by an insulating coating 18 on electrode 7. It will, of course, be understood that the funnel-shaped electrode 6 could be coated with an insulating material instead of the wire electrode 7, or both electrodes could be insulatedly coated with materials of suitable thicknesses. In this embodiment electrode 6 is used as the emitter electrode and 7 as the collector electrode, since electrode 6 has a larger area of surface contact than emitter electrode 6 although the area of surface contact of both the emitter electrode 6 and collector electrode 7 is quite small with respect to the area of contact of return conductor 3. This substantially line contact is permissible for the exciter electrode but is not normally to be desired for the collector electrode which preferably should be in punctiform contact with the semi-conductor member 1. In the structure of Fig. 2 either electrode 6 or 7 may be used as a collector electrode, the other being used as an exciter electrode.

Assuming that, in either structure, electrode 6 is to be used as the exciter and electrode 7 as the collector, and referring to Fig. 1, the supporting button 3 is to be designated as the return conductor, then input voltage variations to be reproduced may be applied between the exciter electrode and the return conductor, a bias being applied with such polarity as to render the exciter electrode slightly positive with respect to the return conductor.

The output circuit of the device is made between the the collector electrode and the return conductor and may include a battery and a load impedance in series, the battery being so polarized as to apply a relatively large negative voltage to the collector electrode with respect to the return conductor. The output voltage variations appear across the impedance in the output circuit, and may be utilized directly, or if necessary with further amplification. Such further amplification may be obtained by a further current control device of the character above described or by means of a thermionic valve or valves.

Alternatively, the device may be used as an oscillator by suitable coupling between input and output circuits.

Circuits utilizing the device are not shown herein, since many circuits will be found useful by those skilled in the art.

The above device provides a relatively simple structure which may be easily manufactured and assembled and which is particularly characterized by ease of adjustment of the electrodes. The electrodes may be easily applied and adjusted independently of the configuration of the semi-conductor material as long as a suitable surface is provided for contact by the electrodes. This is particularly important since certain desirable semi-conductor materials such as germanium are very hard and brittle and very difficult to shape by machining or other methods.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. The method of constructing a current control device of the type employing a semi-conductor material with electrodes in contact with a face thereof comprising the steps of coating one electrode with a thin layer of a hardenable liquid insulating material, removing said coating from the tip of said electrode, positioning the tip of one of the electrodes on the surface of a semi-conductor member, positioning the tip of the other of the electrodes on the same surface of said semi-conductor member and moving one of said electrodes against the other of said electrodes so that said electrodes are maintained in insulatedly spaced relationship by said coating.

2. A semi-conductor device comprising a semi-conducting body, two filamentary electrodes, each having a pointed tip in contact with said body, a further electrode in low resistance contact with said body, and an insulating layer covering each of said filamentary electrodes with the exception of said pointed tips, each of said filamentary electrodes being fastened to, and supported by, a separate supporting member and disposed in angular relationship with one another with said layers contacting each other.

3. A semi-conductor device comprising, a slab of germanium, a conductor in contact with a face of said slab, an exciter electrode and a collector electrode both having sharpened ends in point contact with the opposite face of said slab, a coating of insulating material of a predetermined thickness upon at least one of said electrodes, said electrodes being positioned contiguously and maintained by said coating in relative spaced contact with said slab, and one of said electrodes being sharpened to an off-center point to enable a fine adjustment of the spacing between said electrodes by rotation of the electrode with said off-center point.

References Cited in the file of this patent

UNITED STATES PATENTS

| 2,378,944 | Ohl | June 26, 1945 |
| 2,524,033 | Bardeen | Oct. 3, 1950 |
| 2,524,035 | Bardeen et al. | Oct. 3, 1950 |
| 2,661,448 | Rodgers | Dec. 1, 1953 |
| 2,673,311 | Amico | Mar. 23, 1954 |